United States Patent [19]

Loov

[11] 3,734,549

[45] May 22, 1973

[54] WEDGE FOR USE IN A WEDGE CONNECTION

[76] Inventor: Nils Gosta Loov, Ersmark, Sweden

[22] Filed: Apr. 6, 1971

[21] Appl. No.: 131,608

[30] Foreign Application Priority Data

Apr. 23, 1970 Sweden ........................... 5660/70

[52] U.S. Cl. ...287/20.92 G, 287/20.92 C, 287/54 A, 254/104, 248/223
[51] Int. Cl. ................................................. F16b 7/00
[58] Field of Search ............... 287/20.92 G, 20.92 K, 287/20.92 D, 20.92 C, 189.36 H, 189.36 C, 54 B, 114, 20.3, 56, 54 A, 20.924; 254/104; 248/223

[56] References Cited

UNITED STATES PATENTS

| | | | |
|---|---|---|---|
| 2,857,635 | 10/1958 | Maple et al. | 287/20.92 D |
| 3,214,802 | 11/1965 | Davis | 287/20.92 K |
| 950,989 | 3/1910 | Bowser | 287/20.92 UX |
| 3,289,341 | 12/1966 | Howell | 287/189.36 H X |
| 3,294,429 | 12/1966 | Halip | 287/189.36 H |
| 3,512,325 | 5/1970 | Nichols | 287/20.92 G X |

FOREIGN PATENTS OR APPLICATIONS 188,899   2/1957   Austria ......................... 287/20.92 G Primary Examiner—David J. Williamowsky
Assistant Examiner—Wayne L. Shedd
Attorney—Fred C. Philpitt

[57] ABSTRACT

This invention relates to a wedge member that has a series of projections and recesses which make it possible to observe when the wedge has been driven in sufficiently far to establish the required rigidity of the wedge connection.

3 Claims, 3 Drawing Figures

PATENTED MAY 22 1973 3,734,549
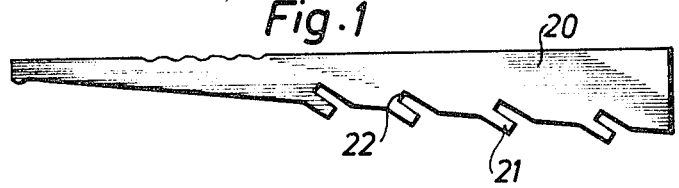
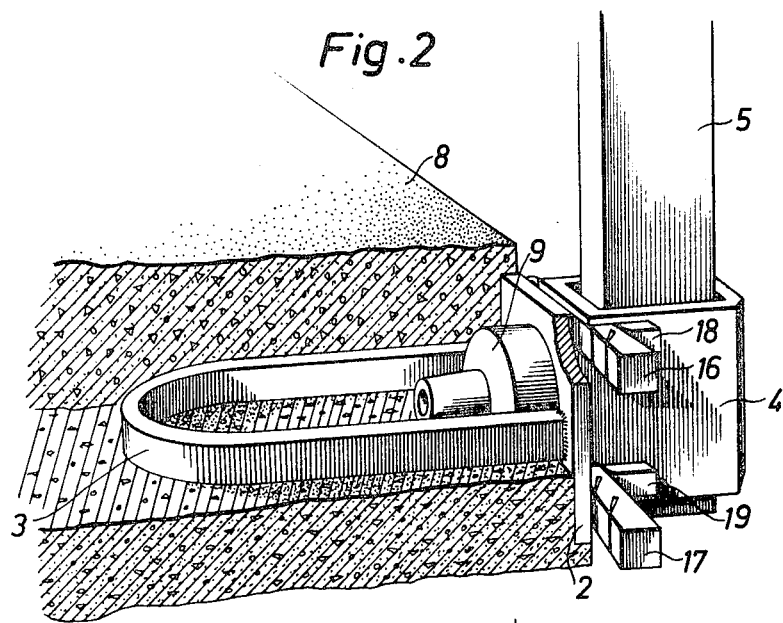
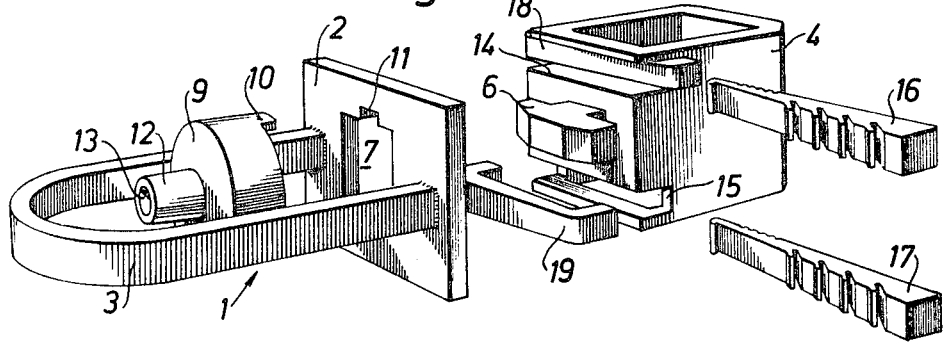

WEDGE FOR USE IN A WEDGE CONNECTION

According to the present invention there is provided a wedge for use in a wedge connection, one wedge surface being provided with a number of projections and behind them with recesses permitting the projections to be pressed into the recesses through flexible or permanent deformation during the insertion of the wedge.

The above arrangement offers the advantage of providing in a simple manner a reliable indication of the moment when the wedge has been driven in sufficiently far in the intended space. During the insertion of the wedge the force which has to be applied thereon to cause a continued movement of the wedge into said space will rise suddenly when the deformable projections have been completely forced into the recesses provided behind them. This sudden change in the required impact force is of such a magnitude that a worker will easily observe it and thus automatically obtain an indication of the fact that the wedge has been driven in sufficiently far.

The invention will be described, by way of example, with reference to its application on a fastening device for balcony railings, banisters, bridge railings and the like. Reference is made to the accompanying drawings in which:

FIG. 1 is a side elevation of a wedge according to the invention;

FIG. 2 is a perspective view, on a reduced scale and partly in section, of a fastening device utilizing two wedges of the kind illustrated in FIG. 1; and FIG. 3 is an exploded perspective view of the fastening device according to FIG. 2.

The fastening device shown in FIGS. 2 and 3 comprises a body portion, generally designated 1, which is adapted to be secured to a fixed part of a building and has a rectangular front plate 2 and a U-shaped anchorage element 3 welded to the front plate 2 and extending from the rear side thereof. Reference numeral 4 designates a socket of substantially rectangular cross-section which is intended to receive and serve as a mounting socket for a substantially vertical post 5 of a railing. On its side facing the body portion 1 the socket 4 has a projecting coupling member 6 having in plan view a substantially T-shaped profile and serving to connect the socket 4 to the body portion 1 in such a manner that the socket can pivot through a small arc about the outer laterally extending flanges of the coupling member 6. As shown in FIG. 3, the front plate 2 is provided with a rectangular opening 7 through which the wider outer portion of the coupling member 6 can be inserted when the socket 4 has been turned 90° from its position shown in the drawing. The flanges of the coupling member 6 can then be brought into engagement with the rear bearing surface of the front plate 2 by turning the socket 4 back to its illustrated position.

In order to secure the required space for the coupling member 6 of the socket 4 when casting the concrete floor 8 one may use a cylindrical sleeve 9 which may be fixed in position together with the body portion. At its forward edge said sleeve 9 has two diametrically opposed projecting teeth 10. These teeth are arranged to be inserted into recesses 11 in the two shorter edges of the opening 7 in the front plate 2. At its rear end the sleeve 9 has an elongation 12 of reduced diameter provided with a threaded through bore 13 serving to make it possible to mount the body portion 1 in a mould board by means of a threaded bolt passing through the front plate 2 and the sleeve 9.

At its side facing the body portion 1 the socket 4 has two grooves 14 and 15 disposed on opposite sides of the coupling member 6 and each arranged to receive one locking wedge 16 and 17, respectively, and one wedge-shaped insert 18 and 19, respectively, having a wedge angle corresponding to the profile of the wedges.

As can be seen from FIG. 3, the wedges 16 and 17 have the same shape as the wedge 20 shown in enlarged scale in FIG. 1. This wedge has on one wedge surface thereof alternating projections 21 and recesses 22. This shape of the wedge 20 is intended to facilitate and ensure that the wedge is inserted sufficiently far in the respective wedge groove to cause the required rigidity of the wedge connection formed. An indication that the wedge has been driven in sufficiently far is achieved when the projections 21 have been forced completely into the respective recesses 22, as the impact force applied on the wedge will then even when considerably increased not cause any substantial continued movement of the wedge into the wedge receiving space.

Naturally, the invention is not restricted to the field of use above described but can be utilized also in various other types of wedge connections.

What I claim is:

1. A fastening device for balcony railings, banisters, bridge railings and the like, comprising in combination
   a. a body portion adapted to be secured to a fixed part of a building or similar rigid structure,
   b. a second portion adapted to be connected for limited pivotal movement with respect to the body portion,
   c. said second portion having a passage for receiving a post of a railing in an upstanding position,
   d. a post,
   e. said post being lockable in a desired position by means of two locking wedges placed on opposite sides of the pivotal axis of said second portion and arranged to act on the one hand against the body portion and on the other against the side of the post facing the body portion
   f. said second portion having the shape of a circumferentially closed socket,
   g. said second portion including a coupling member for connecting the socket to the body portion, said coupling member extending from the wall of said socket and facing said body portion,
   h. said second socket wall containing grooves for receiving the two locking wedges.

2. A fastening device according to claim 1, wherein said coupling member is of generally T-shaped cross-section and the body portion includes a front plate having an opening of a shape such as to permit the coupling member to be inserted therethrough and brought into engagement with bearing surfaces behind said opening through turning the socket.

3. A fastening device according to claim 1 comprising wedge-shaped inserts adapted to be placed behind the locking wedges in said grooves in the socket wall and having a wedge angle corresponding to the profile of the locking wedges.

* * * * *